United States Patent [19]
Worden

[11] 3,927,292
[45] Dec. 16, 1975

[54] WELD BEAD FORM ROLLS

[75] Inventor: Donald P. Worden, Union Grove, Wis.

[73] Assignee: Tenneco Inc., Racine, Wis.

[22] Filed: Oct. 15, 1974

[21] Appl. No.: 514,432

[52] U.S. Cl. ............................................. 219/67
[51] Int. Cl.² ...................................... B23K 7/08
[58] Field of Search .............................. 219/67, 8.5

[56] References Cited
UNITED STATES PATENTS

| | | | |
|---|---|---|---|
| 3,242,301 | 3/1966 | Osborn | 219/8.5 |
| 3,588,426 | 6/1971 | Harriau et al. | 219/67 |
| 3,619,535 | 11/1971 | Sullivan | 219/67 X |
| 3,758,740 | 9/1973 | Dupy | 219/67 |

*Primary Examiner*—J. V. Truhe
*Assistant Examiner*—D. A. Tone
*Attorney, Agent, or Firm*—Harness, Dickey & Pierce

[57] ABSTRACT

A roll set adjacent the welding point forms the outside weld bead that is produced in welded tube manufacture into a thin fin that may be easily removed by a conventional scarfing tool.

11 Claims, 9 Drawing Figures

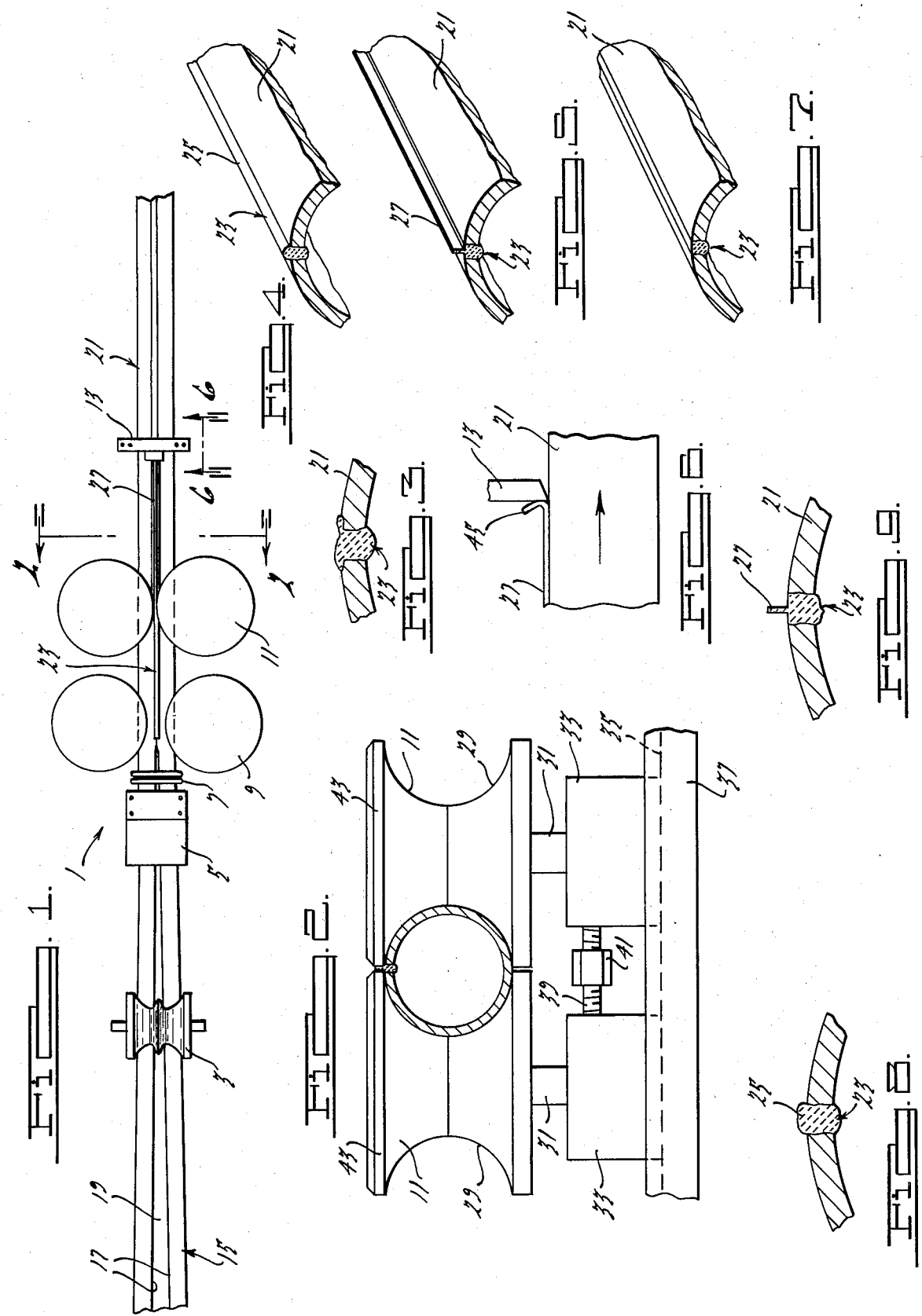

WELD BEAD FORM ROLLS

BACKGROUND OF THE INVENTION

In manufacturing pipe and tubing by a continuous high frequency resistance welding process, it is necessary to remove the exterior upset material referred to as outside weld bead. This is not necessarily a simple thing to do and in cases of some metals, such as ferritic stainless (e.g. A.I.S.I. 409), it presents serious problems. The bead must be cut off at a point downstream between the region where it is too hot and plastic and the region where it is too cold and hard. In the first region the metal tends to come off, or be torn off, in slugs and in the second region the scarfing tool cracks and chips away quickly due to the hardness and abrasiveness of the weld bead material. Another problem is that the mechanical forces of compression and shear at the point of bead removal may produce minute cracks and other types of weakening of the weld in the pipe or tubing. In some cases the weld bead material may be forced into the wall of the tube near the weld to create points of failure which will be revealed later when the pipe is expanded or deformed.

BRIEF SUMMARY OF THE INVENTION

It is the purpose of the invention to provide a method and means to facilitate the removal of the outside weld bead that is formed in the production manufacturing of metal pipe or tubing by a high frequency resistance welding process.

The invention accomplishes this by hot upsetting of the bead into a shape that is more readily removed in scarfing than the natural bead shape. This is preferably done by a pair of rolls located just downstream of the weld pressure rolls which match the shape of the welded tube and which compress the outside bead to a very narrow or fin-like section.

DESCRIPTION OF THE DRAWINGS

FIG. 1 is a schematic plan view of a portion of a tube mill embodying the invention;

FIG. 2 is an enlarged view along the line 2—2 of FIG. 1;

FIG. 3 is a cross section of a segment of tube showing the weld and outside bead after scarfing by a conventional method and illustrates how the tool spreads the bead out and drives part of it against the adjacent tube surface;

FIG. 4 is a perspective view segment of a tube as taken just after welding and illustrates a typical bead prior to scarfing;

FIG. 5 is a view similar to FIG. 4 but shows the bead after treatment in accordance with the present invention;

FIG. 6 is a view along the line 6—6 of FIG. 1 and illustrates the action of a blade type scarfing tool;

FIG. 7 is a perspective view similar to FIG. 4 but shows the bead after scarfing by means of the present invention;

FIG. 8 is a cross section of a segment of tube showing a typical bead configuration after welding and before scarfing; and FIG. 9 is a cross section similar to FIG. 8 but shows the bead after passing through the bead upsetting rolls of the invention.

DETAILED DESCRIPTION OF THE INVENTION

In FIG. 1 a portion of a tube mill 1 is illustrated and comprises a set of drive rolls 3, a seam guide device 5 which may be conventional or of the type described in my copending U.S. application, Serial No. 313,664, filed Dec. 11, 1972, entitled "Welding Process", a high frequency electrical skelp edge heating means such as a two turn inductor coil 7, a set of weld pressure rolls 9, a set of bead forming rolls 11 as provided by the present invention, and a scarfing tool 13. Strip metal formed by roll sets (not shown) into a tubular skelp 15 having side edges 17, separated by a V-shaped gap 19, passes continuously in a longitudinal or axial direction through the mill 1 so that the edges 17 are welded together by pressure rolls 9 to form tubing 21 having a weld bead 23 with an exterior or outside bead portion 25.

At the time of welding the weld bead 23 has an appearance similar to that shown in FIGS. 4 and 8 so that there is excess metal above and below the surface of the tube. It is necessary, ordinarily, to remove the outside bead and with ordinary scarfing equipment and tough metal, such as alloy or stainless steel, the result is often as shown in FIG. 3. It will be noted that instead of a clean removal the bead metal has been smeared out beyond the original thickness of the bead and even driven into the adjacent tube surface to create possible points of stress concentration and premature failure if the tubing is later subjected to severe loading or deformation.

In accordance with the invention, the outside bead 25 is hot worked to a very narrow section or fin 27 as shown in FIGS. 5 and 9. This, of course, is significantly easier to sever from the tubing than the original wide outside bead 25 and, therefore, will result in a substantial increase in the life of the scarfing tool 13. The bead surface after scarfing (FIG. 7) will tend to be smoother and neater than with ordinary methods. Also, the hot working will improve the microstructure of the bead metal and produce resultant benefits in terms of mechanical properties and resistance to crack formation or fracture and, in general, tend to counteract normal weld zone weaknesses.

The hot working is preferably in the form of hot rolling by the rolls 11 which are located downstream from but close to the weld rolls 9. The temperature of the metal in the weld zone as it passes through pressure rolls 9 is somewhat dependent on the specific metal being processed. For A.I.S.I. 409 stainless it is preferably around 2600° to 2700° F, for example. The bead forming rolls 11 are located close enough to the pressure rolls 9 so that the bead metal is still at a high enough temperature to be hot worked, e.g., from 1400° to 1900° F.

The rolls 11 have annular grooves or channels 29 that are shaped to receive the tubing 21 as it leaves the weld pressure rolls 9. The rolls rotate on shafts 31 and are preferably mounted in a suitable manner to permit some adjustment of the distance between their centerlines. One means to illustrate the principle comprises support blocks 33 in which the shafts 31 are rotatably supported, the blocks being shiftable in ways 35 formed in the frame 37. A transverse screw shaft 39, rotated by hex head 41, threads into the blocks 33 so that its rotation will increase or decrease the centerline spacing. Suitable lock means (not shown) may be used to lock the supports in the desired position.

The rolls have upper horizontally aligned annular bead rolling surfaces 43. As the tubing 21 is fed into the rolls 11, the surfaces 43 progressively and transversely work the outside bead 25 until it is shaped into the relatively thin fin 27. The hot working of the plastic bead metal is substantial with a consequent refinement of the grain structure to produce the benefits mentioned above. This plus the fin shape of the bead substantially reduces the difficulty of controlling and handling the material removed by the tool 13 as seen at 45 in FIG. 6 and results in the improved exterior bead surface as illustrated in FIG. 7. Because the cross section at the root of the fin which is to be sheared off by tool 13 is considerably less than that of the original outside bead 25, the wear and tear on the tool is materially reduced and its location with respect to the temperature or plasticity of the bead material is less important, i.e., the metal can be cooler and less plastic than in the case of the bead section 25.

As an example, in manufacturing tubing of about 2 inches O.D. from 409 A.I.S.I. stainless a weld bead of about 0.065 inch to 0.070 inch width was obtained. This was reduced to a fin of about 0.015 inch (i.e., to about ¼ to 1/5 the width) to obtain the advantages set forth.

Thus, the invention provides an improved means and method for removing the outside bead material of welded tubing. It will be appreciated that it will be of especially great benefit in the manufacture of stainless steel tubing or other tubing of tough, shear resistant metal. It is believed that the new method of conditioning the weld bead will have significant benefits on a coated material such as "Chromized" steel since it would appear to make it possible to reduce the width of unprotected material in the weld zone. Modifications in the specific structure and procedures disclosed may be made without departing from the spirit and scope of the invention. With respect to the distance between the rolls 9 and 11, this is preferably substantially a minimum to insure a high bead temperature — the minimum hot working temperatures for a given metal (and thus the maximum spacing) being standard information available in handbooks on metals.

I claim:

1. In a tube mill for making tubing by forming a skelp from strip metal and welding the edges of the skelp together, the combination of means for continuously moving the strip along a path extending longitudinally of the length of the tubing being formed, heating means for continuously heating the edges of the skelp to be welded together, first pressure means to continuously apply welding pressure to the skelp to weld the edges together into a weld having an outside bead, second continuous pressure means for transversely compressing the outside weld bead into a cross section that is substantially thinner at juncture of the outside bead and the tubing than is the weld, and scarfing means for continuously severing the compressed outside weld bead from the tubing along a plane that is substantially flush with the outer surface of the tubing.

2. A tube mill as set forth in claim 1 wherein said second pressure means is located close to the first pressure means so that the outside bead is at an elevated temperature and is hot worked as it passes through the second pressure means.

3. A tube mill as set forth in claim 2 wherein said second pressure means is a set of rolls having cooperating rotating annular surfaces engaging opposite longitudinal sides of the outside bead.

4. A tube mill as set forth in claim 3 including means for adjusting the space between the annular rolls through which the outside bead passes.

5. A tube mill as set forth in claim 1 wherein said second pressure means is shaped to produce a substantially rectangular fin having a width of about 20 – 25% of the width of the weld.

6. A tube mill as set forth in claim 5 wherein said second pressure means comprises a set of rolls having cooperating annular surfaces for engaging opposite sides of said outside bead and means for adjusting the space between said annular surfaces to vary the width of said fin.

7. A method of continuously welding together to form a seam the abutting edges of metal which comprises moving the metal longitudinally in one direction, heating the edges to be welded together, passing the heated edges through a first roll means to apply welding pressure to the edges and produce an outside weld bead on the metal, passing the welded metal through a second roll means to apply upsetting pressure to the outside weld bead to substantially reduce it in thickness at its juncture with the outside surface of the metal and to increase it in height, and thereafter passing the metal by a scarfing tool to remove the outside weld bead by severing it along said juncture with the outside surface of the metal.

8. A method as set forth in claim 7 wherein said metal is passed through said second roll means while said weld bead is at an elevated temperature so that the metal of the bead is hot worked by the second rolls.

9. A method as set forth in claim 8 wherein said outside bead is reduced to about 20 – 25% of the thickness of the weld.

10. A method as set forth in claim 7 wherein said outside bead is reduced to the shape of a thin fin.

11. The method of making metal tubing comprising forming a skelp having longitudinally extending confronting edges to be welded together to form a seam, heating said edges to welding temperature and applying welding pressure to them to weld them together and form a weld bead having an outside portion extending radially beyond the outer surface of the tubing, applying transverse pressure to opposite sides of said outside portion while it is heated to a hot working temperature to materially reduce its thickness and to shape it into a fin, and severing said fin from said tubing along a line substantially flush with the outer surface of the tubing.

* * * * *